United States Patent [19]

Tobinaga et al.

[11] Patent Number: 5,556,913

[45] Date of Patent: * Sep. 17, 1996

[54] CATIONIC ELECTROCOATING COMPOSITION

[75] Inventors: Kenshiro Tobinaga, Kawanishi; Hiroyuki Sakamoto, Nishinomiya; Shinsuke Shirakawa, Suita; Satoshi Urano, Tsuzuki-gun; Yasuyuki Tsuchiya, Hirakata, all of Japan

[73] Assignee: Nippon Paint Co., Ltd., Osaka-fu, Japan

[ * ] Notice: The term of this patent shall not extend beyond the expiration date of Pat. No. 5,348,991.

[21] Appl. No.: 176,508

[22] Filed: Jan. 3, 1994

Related U.S. Application Data

[63] Continuation-in-part of Ser. No. 962,049, Oct. 16, 1992, abandoned, which is a continuation of Ser. No. 621,439, Dec. 4, 1990, abandoned.

[30] Foreign Application Priority Data

Dec. 4, 1989 [JP] Japan ............... 1-314584
Aug. 29, 1990 [JP] Japan ............... 2-228799

[51] Int. Cl.$^6$ .................. C08J 3/00; C08K 3/20; C08L 39/00
[52] U.S. Cl. ............... 524/555; 524/901; 525/282; 525/328.2; 526/303.1; 526/304; 526/288
[58] Field of Search ............... 524/555, 901; 525/282, 328.2; 526/303.1, 304, 288

[56] References Cited

U.S. PATENT DOCUMENTS

| | | | |
|---|---|---|---|
| 4,170,579 | 10/1979 | Bosso et al. | 523/415 |
| 4,742,097 | 5/1988 | Turpin et al. | 523/411 |
| 4,935,413 | 6/1990 | Urano et al. | 514/304 |
| 4,956,491 | 9/1990 | Suzuki et al. | 526/304 |
| 5,348,991 | 9/1994 | Yoshikawa et al. | 526/304 |

OTHER PUBLICATIONS

Odian George, Principles of Polymerization 1981, pp. 319–320, 322.

*Primary Examiner*—Paul R. Michl
*Assistant Examiner*—Patrick Niland
*Attorney, Agent, or Firm*—Wenderoth, Lind & Ponack

[57] ABSTRACT

The present invention provides a cationic electrocoating composition which cures at the preferred curing temperature range and provides superior curing properties and cured film properties. The cationic electrocoating composition of the present invention comprises a resinous component and an aqueous medium, wherein the resinous component is composed of one or more polymers and has as a whole an active hydrogen containing group, a cationic group and a substituted group and at least one of the polymers comprises a vinyl polymer which has 5 to 1,000 substituted acylamide groups.

14 Claims, No Drawings

CATIONIC ELECTROCOATING COMPOSITION

This application is a continuation-in-part of now abandoned application, Ser. No. 07/962,049, filed Oct. 16, 1992, which in turn is a continuation of now abandoned application Ser. No. 07/621,439, filed Dec. 4, 1990.

FIELD OF THE INVENTION

The present invention relates to a cationic electrocoating composition which is used as a primer of automobiles and structural members.

BACKGROUND OF THE INVENTION

It is required that the cationic electrocoating compositions are stable at ambient temperature and quickly cure at an elevated temperature. In order to comply with the requirement, the curing temperature is very important. If the curing temperature is too high, energy consumption increases. If it is low enough to reach near ambient temperature, the compositions have poor storage stability. Accordingly, it is desired that the curing temperature is existent not near ambient temperature, but is not far from it.

Hitherto, the curing systems of the cationic electrocoating compositions, which have been employed, include a melamine curing system (e.g. U.S. Pat. No. 3,367,991, Japanese Kokai Publications (unexamined) 1256/1985 and 41571/1988); and a blocked isocyanate curing system (e.g. Japanese Kokoku Publications (examined) 34238/1980, 4978/1979, 22912/1981 and 39351/1986). The melamine curing system does not cure sufficiently at a suitable low temperature because the curing system proceeds in basic condition. In the blocked isocyanate curing system, it is difficult to cure at the desired temperature, because the blocked isocyanate curing agent is generally unblocked at relatively high temperatures. Although it is possible that the unblocking temperature lowers by selecting a blocking agent or a catalyst, such selection has some limits in view of coating composition ingredients, cured film properties and the like.

SUMMARY OF THE INVENTION

The present invention provides a cationic electrocoating composition which cures at the preferred curing temperature range and provides superior curing properties and cured film properties. The cationic electrocoating composition of the present invention comprises a resinous component and an aqueous medium, wherein the resinous component is composed of one or more polymers and has as a whole an active hydrogen containing group, a cationic group and a substituted group and at least one of the polymers comprises a vinyl polymer which has 5 to 1,000 substituted acylamide groups represented by

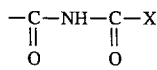

wherein

X is $-OR_1$, $-NR_2R_3$, $-SR_4$ or $-CR_5R_6R_7$, provided that $R_1$ and $R_4$ respectively represent an alkyl group, an alkenyl group, an alkynyl group, an aralkyl group, an aryl group, an imino group, an acyl group or an imide group, which may be substituted or cyclized, $R_2$ and $R_3$ respectively represent a hydrogen atom, an alkyl group, an alkenyl group, an alkynyl group, an aralkyl group, an aryl group or an acyl group, which may be substituted or cyclized, and at least one of $R_5$, $R_6$ and $R_7$ is an acyl group, and the others respectively represent a hydrogen atom, an alkyl group, an alkenyl group, an alkynyl group, an aralkyl group, an aryl group or an acyl group, which may be substituted or cyclized.

DETAILED DESCRIPTION OF THE INVENTION

The substituted acylamide group and the active hydrogen-containing group contribute to curing reaction in which the substituent of the substituted acylamid group is replaced with the active hydrogen-containing group. The cationic group is necessary for water solubility or dispersibility and cathodic electrodeposition. It is therefore essential that the substituted acylamide group, the cationic group and the active hydrogen-containing group are present in the resinous component of the coating composition. Accordingly, for example, the above described three kinds of the functional groups may be contained in one resin. In addition, the above described three kinds of the functional groups may be contained in different resins, that is two kinds of the resins, or three kinds of the resins. Further, the one functional group, for example, the substituted acylamide group may be contained in two or three kinds of the resins.

It is also required that the resinous component of the present invention contains a vinyl polymer which has 5 to 1,000 substituted acylamide groups in one molecule. If the groups are less than 5 in one molecule, the composition cures insufficiently so as to decline corrosion resistance of the coating. If the groups are more than 1,000 in one molecule, an appearance of the coating becomes poor.

The active hydrogen-containing group of the present invention includes a carboxyl group, a hydroxyl group, an amino group, a thiol group, a sulfonic acid group and the like. The cationic group is an ammonium group and another onium group. The amino group of the active hydrogen-containing group is neutralized with an acid to form the ammonium group, so that the amino group can be changed to the cationic group by neutralizing. The substituted acylamide group is represented by

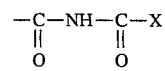

wherein

X is $-OR_1$, $-NR_2R_3$, $-SR_4$ or $-CR_5R_6R_7$, provided that $R_1$ and $R_4$ respectively represent an alkyl group, an alkenyl group, an alkynyl group, an aralkyl group, an aryl group, an imino group, an acyl group or an imide group.

$R_2$ and $R_3$ respectively represent a hydrogen atom, an alkyl group, an alkenyl group, an alkynyl group, an aralkyl group, an aryl group or an acyl group, and at least one of $R_5$, $R_6$ and $R_7$ is an acyl group, and the other respectively represents a hydrogen atom, an alkyl group, an alkenyl group, an alkynyl group, an aralkyl group, an aryl group or an acyl group. Examples of the alkyl groups are $C_1$–$C_{18}$ alkyl groups, such as methyl, ethyl, propyl, isopropyl, butyl, sec-butyl, tert-butyl, 2-ethylhexyl and stearyl. Examples of the alkenyl groups are $C_2$–$C_{18}$ alkenyl, such as propenyl, butenyl and isobutenyl. The alkynyl concretely includes a $C_2$-$C_{18}$ alkynyl, such as propynyl, butynyl, decynyl and propargyl. Typical Examples of the aralkyl groups are $C_7$-$C_{18}$ aralkyl groups, such as benzyl and phenetyl. Typical examples of the aryl groups are $C_6$-$C_{18}$ aryl groups, such as phenyl and naphthyl. The imino group concretely represents —N=C—$R_8R_9$, provided that $R_8$ and $R_9$ are the same as $R_2$ and $R_3$. Typical examples of the acyl groups are formyl, acetyl and benzoyl. Typical examples of the imide groups are maleimide and phthalimide. The groups may be substituted with other groups or may be cyclized. Examples of the substituents are an amino group, a furyl group, tetrahydrofuryl group, an acetyl group, a methoxycarbonyl group, an alkoxy group and the lile. It is preferred that $R_1$ to $R_7$ has an oxygen atom at a gamma position or a nitrogen atom at an alpha position in respect to O, N, S or C. Examples of such groups are methoxyethyl, ethoxyethyl, butoxyethyl, hexyloxyethyl, 2-butylideneamino, furfuryl, tetrahydrofurfuryl, ethoxycarbonylmethyl and acetylmethyl.

The vinyl polymer which contains the acylamide group is generally prepared from a substituted acylamide group-containing vinyl monomer ($m_3$) represented by

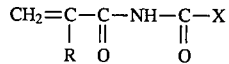

wherein

R represents a hydrogen atom or an alkyl group having 1 to 4 carbon atoms, and X is the same as mentioned above.

The substituted acylamide group-containing vinyl monomer ($m_3$) is described in detail in U.S. Pat. No. 4,935,413

The monomer ($m_3$) can be polymerized solely or in combination with other copolymerizable monomers. The copolymerizable monomers include an active hydrogen-containing vinyl monomer ($m_1$), a cationic group-containing vinyl monomer ($m_2$) and a vinyl monomer ($m_4$) which does not contain the above mentioned functional groups.

The active hydrogen-containing vinyl monomers ($m_1$) include carboxylic acid group-containing monomers (for example, acrylic acid, methacrylic acid, crotonic acid, cinnamic acid, 2-isopropylacrylic acid, trans-2-decenoic acid, cis-2-decenoic acid, alpha-chloroacrylic acid, beta-trans-nitroacrlylic acid, isocrotonic acid, 2-pentenoic acid, 2-ethylacrylic acid, tiglic acid, 3,3-dimethylacrylic acid, propylacrylic acid, itaconic acid, 2-methyl-3 -ethylacrylic acid, 2-ethytcrotonic acid, maleic acid, trimethylacrylic acid, butylacrylic acid, 2-methyl-2 -hexenoic acid, 3-methyl-3-propylacrylic acid, 2,3 -diethylacrylic acid, 4-methyl-2-hexenoic acid, 3,3 -diethylacrylic acid, 3-tert-butylacrylic acid, 2,3-dimetyl-3-ethylacrylic acid, 3-methyl-isopropylacrylic acid, 2-octenoic acid, 2-pentylacrylic acid, 2-butylcrotonic acid, 2-nonenoic acid, 2-hexylacrylic acid and 4-ethyl-2-octenoic acid); unsaturated alcohols (for example, monoesters of the above described unsaturated acids and glycols (such as, ethylene glycol and propylene glycol), crotonic alcohol, cinnamyl alcohol, o-hydroxystyrene, 2-hydroxyethyl acrylate, N-(2-hydroxyethyl) acrylamide, N-(2-hydroxyethyl)methacrylamide, 2-hydroxymethyl acrylonitrile and 3-hydroxy-2-benzoyl acrylonitrile); amino group-containing monomers, (for example o-aminostyrene, p-aminostyrene, p-(2 -aminoethyl)styrene, vinylethylamine, vinylbutylamine, 2 -[(1,1-dimethylethyl)amino]ethyl acrylate, tert-octylaminoethyl methacrylate, 3-amino-2-phenylacrylonitrile, 2-aminomethylacrylonitrile, N-(-isopropylaminopropyl) methacrylamide and N-[4-(phenylamino)phenyl]acrylamide); unsaturated amides (for example, (meth)acrylamide, N-methyl (meth)acrylamide, N-n-butyl (meth)acrylamide, N-(1,1 -dimethylbutyl) (meth)acrylamide, N-ally (meth)acrylamide, N-phenyl (meth)acrylamide, N-benzyl (meth)acrylamide, N-phenyl (meth)acrylamide, N-(3-ethoxyphenyl) (meth)acrylamide, N-( 2,3-dimethylphynyl) (meth)acrylamide, N-(benzoxymethyl) (meth)acrylamide, N-(methoxymethyl) (meth)acrylamide, N-(allyloxymethyl) (meth)acrylamide, N-(2,2,2-trichloro-1 -methoxyethyl) (meth)acrylamide, crotonamide, cinnamamide, p-benzamidestyrene, methylacrylamide, glycolate-metyl ether and methacrylamide propanesulfonic acid); sulfonic acid group-containing monomers or salts thereof (for example, 2-sulfoethyl (meth)acrylate, 2-sulfoethyl methacrylate, t-butylacrylamidesulfonic acid, 4-sulfophenyl acrylate and p-vinylbenzenesulfonic acid); phosphoric acid group containing monomers or salts thereof (for example, acidphosphoxyethyl methacrylate, 3-chloro-2-amidephosphoxypropyl methacrylate, acidphosphoxypropyl methacrylate, vinylphosphate and isopropenyl phosphate); and the like. These may be used singly or in combination.

The cationic group may be introduced by neutralizing an amino group with an acid or by quaternarizing an amino group with a monoepoxy compound. It may also be introduced by reacting an epoxy group-containing polymer with an amine. The epoxy group may be introduced into the vinyl polymer from glycidyl (meth)acrylate and the like. The cationic group-containing monomer ($m_2$), as mentioned above, does not exist by itself, but it is treated as if it exists because monomers should be designed such that the cationic group is present in the polymer.

The monomers ($m_4$) without the function groups include monoolefins and diolefins (for example, styrene, alpha-methylstyrene, alpha-ethylstyrene, isobutylene, 2 -methylbutene-1, 2-methylpentene-1, 2,3-dimetylbutene-1, 2,3 -dimethylpentene-1, 2,4-dimethylpentene-1, 2,3,3-trimethyl-heptene-1, 2,3-dimethyl-hexene-1, 2,4-dimethyl-hexene-1, 2,5-dimethylhexene-1, 2-methyl-3-ethylpentene-1, 2,3,3-trimethylpentene-1, 2,3,4-trimethylpentene-1, 2,3,4 -trimethyl-pentene-1,2-methyloctene-1, 2,6-dimethylheptene-1, 2,6-dimethyloctene-1, 2,3-dimethyldecene-1, 2-methyl-nonadecene- 1, ethylene, propylene, butylene, amylene, hexylene, butadiene-1,3 and isoprene), halogenated monoolefins and diolefins (for example, alph-chloristyrene, beta-bromostyrene, 2,5-dichlorostyrene, 2,5-dibromostyrene, 3,4-dichlorostyrene, ortho-, metha- and para-fluorostyrene, 2,6-dichlorostyrene, 3-fluoro-4-chlorostyrene, 3-chloro-4 -fluorostyrene, 2,4,5-trichlorostyrene, dichloromonofluorostyrene, 2-chloropropene, 2,6 -difluorostyrene, 2-chlorobutene, 2-chloropentene, 2 -chlorohexene, 2-bromobutene, 2-bromoheptene, 2-fluorohexene, 2-fluorobutene, 2-iodopropene, 2-iodopentene, 4 -bromoheptene, 4-chloroheptene, 4-fluoroheptene, cis- and trans-1,2-dichloroethylene, 1,2-dibromoethylene, 1,2 -difluoroethylene, 1,2-diiodoethylene, chloroethylene(vinyl chloride), 1,1-dichloroethylene(vinylidene chloride), bromoethylene, fluoroethylene, iodoethylene, 1,1 -dibromoethylene, 1,1-difluoroethylene, 1,1-diiodoethylene, 1,1,2-frifluoroethylene and chlorobutadiene), esters of organic and inorganic acids (for example, vinyl acetate, vinyl propionate, vinyl butylate, vinyl isobutylate, vinyl caproate, vinyl enanthate, vinyl benzoate, vinyl toluate, vinyl-p-chlorobenzoate, vinyl-o-chlorobenzoate, vinyl-p-methoxybenzoate, vinyl-p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl tiglate, methyl acrylate, ethyl acrylate, propyl acrylate, isopropyl acrylate, butyl acrylate, isobutyl acrylate, amyl acrylate, hexyl acrylate, 2 -ethylhexyl acryalte, heptyl acrylate, octyl acrylate, allyl chloride, allyl cyanide, allyl bromide, allyl fluoride, allyl iodide, allyl chloride carbonate, allyl nitrate, allyl thiocyanate, allyl acetate, acetate propionate, allyl butylate, allyl valeate, allyl caproate, metallyl chloride, metallyl cyanide, decyl-alpha-chloroacrylate, methy-alpha-cyanoacrylate, ethyl-alpha-cyanoacrylate, amyl-alpha-cyanoacrylate, decyl-alpha-cyanoacrylate, dimethyl maleate, diethyl maleate, diallyl maleate, dimethyl fumarate, diethyl fumarate, dimetallyl fumarate and diethyl glutaconate), organic nitriles (for example, acrylonitrile, methacrylonitrile, ethacrylonitrile, 3-octenenitrile, crotonitrile and oleonitrile) and the like.

The above described monomers are subjected to polymerization, for example radical polymerization, in a solvent which is inert to the polymerization. In the case of the radical polymerization, the usual radical initiators are used, including azobisisobutylonitrile, benzoyl peroxide, cumene hydroperoxide, tetramethylthiuram disulfide, 2,2'-azobis(4-methoxy-2,4-dimethylvaleronitrile), acetylcyclohexylsulfonyl peroxide, 2,2'-azobis(2,4 -dimetylvaleronitrile) and the like. The initiators are generally used in a quantity of 0.1 to 10% by weight based on the total monomer weight. The polymerization temperature is usually 20° to 200° C., preferably 80° to 150° C.

The solvent employed in the polymerization reaction is inert to the polymarization reaction, but includes hydrocarbons, ethers, ketones, esters, alcohols, amides, sulfoxides and the like. The solvent may be substituted with a group which is inert to the polymerization reaction.

In the polymerization, other additives, for example polymerization regulator and the like, may be added in case of need.

Since the substituted acylamide group has very high reactivity with the active hydrogen-containing group, the vinyl polymer having the acylamide group may be prepared by emulsion-polymerization to make vinyl polymer particles in which the reactive acylamide groups are protected or covered. This particulate polymer enhances storage stability of the obtained electrocoating composition. In this enbodiment, it is preferred that the monomers which constitute the vinyl polymer do not contain the active hydrogen-containing group, because the stability of the substituted acylamide group is adversely affected by the active hydrogen-containing group. Emulsion polymerization is carried out in the presence of an emulsifier, preferably a cationic emulsifier. The emulsifier can be either low molecular or high molecular and includes a monoalkylammonium salt, such as laurylammnium salt or stearylammonium salt; a dialkylammonium salt, such as dioctylammonium salt, dilaurylammonium salt or distearylammonium salt; a trialkylammonium salt, such as lauryldimethylammonium salt or stearyldimethylammonium salt; a tetraalkylammonium salt, such as dioctyldimethylammonium salt, cetyltrimethylammonium salt, lauryltrimethylammonium salt, stearyltrimethylammonium salt, distearyldimethylammonium salt or laurydimethylbenzylammonium salt; an ethanolammonium salt, such as dihydroxyethylstearylammonium salt or a salt of triethanolamine monostearate; a pyridinium salt, such as laurylpyridinium salt, stearylpyridinium salt or stearamidemethylpyridinium salt; an imidazolinium salt, such as 2-stearyl-hydroxyethylimidazolinium salt; a mono-, di-, trior tetra-alkylammonium salt of polyoxypropylenepolyamine (e.g. Jephamine D-200, D-400 and T-403 available from Texxaco Chemical Company); and the like. The cationic emulsifier may be a cationic polymer which is generally formulated in a cationic electrocoating composition. In this emulsion polymerization, a polymerization initiator is water soluble, including an azo amide; such as 1-[(1-cyano-1-methylethyl)azo]formamide, 2,2'-azobis{2-methyl-N-[1, 1-bis(hydroxymethyl)-2 -hydroxymethyl]propionamide} and 2,2'-azobis[2-methyl-N-(2 -hydroxyethyl)-propionamide; an azo amidine, such as 2,2'-azobis(2-methyl-N-phenylpropionamidine) dihydroxychloride, 2,2'-azobis[N-(4-aminophenyl)-2-methylpropionamidine]tetrahydrochloride, 2,2'-azobis[2-methyl-N-2 -propenylpropionamidine]dihydrochloride, 2,2'-azobis(2 -ethylpropionamide)dihydrochloride and 2,2'-azobis[N-(2 -dihydroxyethyl)-2-ethylpropionamidine]dihydrochloride; a cyclic azoamidine, such as 2,2'-azobis[2-(5-methyl-2 -imidazoline-2-il)propane] dihydrochloride, 2,2'-azobis[2 -(2-imidazoline-2-il)propane]dihydrochloride, 2,2'-azobis[2 -(4,5,6,7-tetrahydro-1H-1,3-diazepin-2-il)propane]dihydrochloride and 2,2'-azobis[2-(3,4,5,6 -tetrahydropyrimidine-2-il)propane]dihydrochloride; a peroxide, such as ketoneperoxide and diarylperoxide; and the like. An amount of the substituted acylamide group containing vinyl monomer is adjusted to at least $1\times10^{-5}$. It is preferred that the polymerization initiator is present in an amount of 0.1 to 20% by weight based on the total amount of the monomers. It is also preferred that the cationic emulsifier is present in an amount of 1 to 70% by weight, more preferably 5 to 20% by weight based on the total amount of the monomers. If the emulsifier is less than one % by weight, the obtained particles are too large. If the emulsifier is more than 70% by weight, the polymerization reaction is not sufficiently accomplished. The process for emulsion polymerization is not limited, but generally conducted by adding dropwise a monomer emulsion to an aqueous solution containing the polymerization initiator. It can be carried out at a temperature of 40° to 95° C. for 1 to 5 hours. The obtained polymer particles preferably have an average particle size of 10 to 1,000 nm, particularly 20 to 200 nm and have a number average molecular weight of 1,000 to 100,000. The obtained polymer particles contain substituted acylamide groups in the form of being protected in the particles, but the groups are reacted with the active hydrogen-containing groups at an elevated temperature to cure the coating composition.

In this polymer particle embodiment, the polymer particles may be prepared by the other method wherein a vinyl polymer having a substituted acylamide group is preliminary prepared by solution-polymerization and then combined in the presence of water and acid with a resin which has at least one group selected from hydroxyl group, a secondary or tertiary amino group, a quaternary ammonium group or a tertiary tionium group. Examples of the resins are an epoxy resin having tertiary amino groups, an epoxy resin having secondary amino groups, an epoxy resin having quaternary ammonium groups, an epoxy resin having tertiary thionium groups and a vinyl polymer having tertiary amino groups. In this method, the polymer particles in which substituted acylamide groups are protected are also obtained and functioned as mentioned above.

In addition to the above described vinyl polymer, the resins contained in the coating composition of the present invention may be non-vinyl polymers, e.g. epoxy resins, polybutadiene resins, acrylic resins, alkyd resins, polyester resins, polyamide resins, polyether resins, fluorine resins, silicon resins or modified resins thereof. The substituted acylamide group is introduced into the resin components by the substituted acylamide group-containing monmoers ($m_3$), so that the substituted acylamide groups are introduced into the coating composition in the form of vinyl polymer. On the other hand, the cationic groups and the active hydrogen-containing groups may be introduced in the form of resins which have been used in conventional water borne paints, rather than the vinyl copolymers.

As the resinous components of the present invention, the following combinations are generally exemplified.

(1) The resinous component comprises a vinyl polymer ($p_1$) which has an active hydrogen-containing group, a cationic group and a substituted acylamide group. The polymer ($p_1$) is prepared by polymerizing an active hydrogen-containing vinyl monomer ($m_1$), a cationic group-containing vinyl monomer ($m_2$), a substituted acrylamide group-containing vinyl monomer ($m_3$), and optionally another monomer ($m_4$) which does not contain the above mentioned functional group.

(2) The resinous component comprises;

($p_2$) a vinyl polymer having a substituted acylamide group, and ($r_2$) the other resinous component having both an active hydrogen containing group and a cationic group. The vinyl polymer ($p_2$) is prepared by polymerizing the monomer ($m_3$) and optionally the monomer ($m_4$).

(3) The resinous component comprises;

($p_3$) a vinyl polymer having a substituted acrylamide group and a cationic group, and ($r_3$) the other resinous component having an active hydrogen-containing group. The vinyl polymer ($p_3$) is prepared by polymerizing the monomer ($m_2$), the monomer ($m_3$) and optionally the monomer ($m_4$).

(4) The resinous component comprises;

($p_4$) a vinyl polymer having a substituted acrylamide group and an active hydrogen-containing group, and ($r_4$) the other resinous component having a cationic group. The vinyl polymer ($p_4$) is prepared by polymerizing the monomer ($m_1$), the monomer ($m_3$) and the monomer ($m_4$).

The resinous component may further contain the other resins in order to improve coating properties or other film or composition properties.

It is desirable that the equivalence of the substituted acylamide group in the resinous components used in the present invention is $1 \times 10^{-5}$ or more, preferably within the range of $1 \times 10^{-4}$ to $50 \times 10^{-4}$. The equivalence is expressed by the equivalence of the substituted acylamide group based on 1 g of all resin components. In the event that the equivalence of the substituted acylamide group is less than $1 \times 10^{-5}$, the paint can not be sufficiently cured. It is also desirable that the equivalence of the active hydrogen (expressed by the equivalence of the active hydrogen existing in all resin components of 1 g in the same manner as the above described equivalence of the substituted acylamide group) is $1 \times 10^{-5}$ or more, preferably within the range of $1 \times 10^{-4}$ to $50 \times 10^{-4}$. If the equivalence of the active hydrogen is less than $1 \times 10^{-5}$, the paint can not be sufficiently cured when baked. In addition, it is desirable that the equivalence of the cationic existing in the resinous component is within the range of $1 \times 10^{-4}$ to $40 \times 10^{-4}$, preferably within the range of $3 \times 10^{-4}$ to $30 \times 10^{-4}$. If the equivalence is less than $1 \times 10^{-4}$, the composition is not electrodepositable If the equivalence is higher than $40 \times 10^{-4}$ the hydrophilicity is too enhanced and thus bad influence are exerted upon the water-proofness, weather resistance and the like of the cured film.

The preparation of the above described resin, i.e. the limitation of the equivalences of the respective functional groups, has been known to the person skilled in the art and can be achieved by selecting the polymerization conditions, the modification conditions and other conditions. The number average molecular weight of the resins is a molecular weight which has been usually used for electrocoating compositions and it is desirable that the number average molecular weight of the resins is for example 250 to 50,000, preferably 1,000 to 100,000, more preferably 1,000 to 50,000. If the number average molecular weight of the resins is out of the range, the cured film has poor coating properties.

The cationic electrocoating composition of the present invention is prepared by partially neutralizing the mixture of the above mentioned component in an aqueous medium. The neutralization is carried out with an acid, such as an inorganic acid (e.g. hydrochloric acid and sulfuric acid) and an organic acid (e.g. sulfamic acid, formic acid, acetic acid and lactic acid). Other solvents, for example alcohols, polyvalent alcohols, derivatives of polyvalent alcohols, hydrocarbons, ketones and ethers, may be added to the aqueous medium so far as the composition is stable.

The composition may further contain a pigment and an additive, if necessary. Examples of the pigments are those used for electrocoating, such as iron oxide, lead oxide, strontium chromate, zinc chromate, carbon black, titanium dioxide, aluminum silicate, precipitated barium sulfate, basic lead silicate, aluminum phosphomolybdate, surface treated kaoline, calcined kaoline, an extender pigment and the like. An amount of the pigment may be 3 to 30 parts by weight, preferably 5 to 20 parts by weight based on the solid content of the coating composition. Examples of the additives are surfactant, curing catalyst (e.g. an organic tin oxide).

Electrocoating conditions are those known to the art, preferably at a bath temperature of 15° to 35° C., a solid content of 3 to 25% by weight and a coating voltage of 30 to 350 volt. A substrate to be coated can be metal, such as iron, copper, aluminum, zinc, and an alloy thereof; or a conductive organic material.

The cationic electrocoating composition of the present invention is coated on the substrate and baked at a temperature of 100° to 140° C. to form cured coatings. The curing temperature range is ideal for electrocoating. The cured coatings has excellent properties, such as weather resistance, corrosion resistance, adhesion and water resistance.

EXAMPLE

The present invention is in more detail described with reference to the preferred examples, but the present invention is not limited by these examples.

Production Example 1

(Vinyl copolymer A)

A 2 liter reaction vessel equipped with a dropping funnel, a condenser, a thermometer and a stirrer was charged with 175 g of dioxane and heated to 80° C. with stirring. To the content was added dropwise for 2 hours a solution of 300 g of 2-ethylhexylalkoxyacyl methacrylamide, 200 g of ethyleneglycol monomethyl methacrylate, 12.5 g of azobisisobutylonitrile and 300 g of dioxane. After the completion of the addition, mixing continued for one hour and 25 g of a dioxane solution of 2.5 g of azobisisobutylonitrile was added, followed by reacting at 80° C. for 3 hours to obtain a resin solution having a nonvolatile content of 49% and a number average molecular weight of 4,500.

Production Example 2

(Aminated epoxy resin A)

A reaction vessel equipped with a condenser, a thermometer and a tirrer was charged with 920 g of Epototo YD-011 (an epibis type epoxy resin of Toto Kasei KK), 210 g of caprolactone diol (available from Daicel Chemical Co., Ltd. as Praccel 205 and 60 g of xylene, and heated to 130° C. To the content, 3 g of dimethylbenzylamine was added to adjust an epoxy value to 1100 at which 220 g of methyl isobutyl ketone was added and cooled to 100° C. At this temperature, 75 g of a ketimine solution (nonvolatile content 70%) of 60 g of N-methylethanolamine and diethylenetriamine in methyl isobutyl ketone was added to exotherm to 110° C. at which mixing continued for one hour and then cooled to obtain an aminated epoxy resin A having a nonvolatile content of 80%.

Production Example 3

(Vinyl copolymer B)

A same reaction vessel as Production Example 1 was charged with 175 g of dioxane and heated to 70° C. with stirring. A solution of 300 g of 2-ethylhexylalkoxyacyl methacrylamide, 104 g of 2-hydroxypropyl methacrylate, 96 g of dimethylaminopropyl methacrylamide, 6.6 g of azobisisobutylonitrile and 300 g of dioxane was prepared and added to the reaction vessel. Polymerization reaction was conducted as generally described in Production Example 1 to obtain a resin solution having a nonvolatile content of 50% and a number average molecular weight of 10,500.

Production Example 4

(Aminated epoxy resin B)

A chain extension was carried out as generally described in Production Example 2 and, at an epoxy equivalent of 1,100, 220 g of methyl isobutyl ketone was added and cooled to 90° C. At this temperature, 75 g of N-methylethanolamine was added and slowly heated to 110° C., followed by mixing for one hour and then cooling to obtain an aminated epoxy resin B having a nonvolatile content of 81%.

Production Example 5

(Aminated polybutadiene resin A)

A polybutadine (number average molecular weight 2,000 and 1,2-bond 65%; B-2,000 available from Nippon Petrochemical Co., Ltd.) was epoxidized with peracetic acid to form an epoxidized polybutadiene having an oxiran content of 6.4%.

Next, 1,000 g of obtained epoxidized polybutadiene and 354 g of ethyleneglycol monoethyl ether were charged in a 2 liter autoclave, to which 62.1 g of dimethylamide was added and reacted at 150 for 5 hours. After removing unreacted amine, it was cooled to 120° C. and a mixture of 79.3 g of acrylic acid, 7.6 g of hydroquinone and 26.4 g of ethyleneglycol monoethyl ether was added and reacted at 120 for 3 hours and 45 minutes to obtain an aminated polybutadiene resin having an amine value of 85.2 mmol/100g, an acid value of 10.0 mmol/100g and a solid content of 75.4%.

Production Example 6

(Vinyl copolymer C)

A same reaction vessel as Production Example 1 was charged with 255 g of dioxane and heated to 80° C. with stirring. A solution of 220 g of 2-ethylhexylalkoxyacyl methacrylamide, 280 g of diethyleneglycol monomethyl methacrylate, 12.5 g of azobisisobutylonitrile and 220 g of dioxane was prepared and added to the reaction vessel. Polymerization reaction was conducted as generally described in Production Example 1 to obtain a resin solution having a nonvolatile content of 50% and a number average molecular weight of 3,400.

Production Example 7

(Vinyl copolymer D)

A same reaction vessel as Production Example 1 was charged with 175 g of dioxane and heated to 80° C. with stirring. A solution of 300 g of 2-ethylhexylalkoxyacyl methacrylamide, 190 g of ethyl methacrylate, 10 g of dimethylaminopropyl methacrylamide, 12.5 g of azobisisobutylonitrile and 300 g of dioxane was prepared and added to the reaction vessel. Polymerization reaction was conducted as generally described in Production Example 1 to obtain a resin solution having a nonvolatile content of 50% and a number average molecular weight of 3,800.

Production Example 8

(Pigment paste)

A reaction vessel was charged with 24 g of the aminated epoxy resin A of Production Example 2, to which 2.4 g of acetic acid, 47 g of deionized water, 1 g of carbon black, 14 g of titanium oxide, 5 g of basic lead silicate and 14 g of aluminum silicate was added and mixed to obtain a pigment paste.

Production Example 9

(Aminated epoxy resin emulsion)

A reaction vessel was charged with 100 g of the aminated epoxy resin A of Production Example 2, 2.9 g of acetic acid and 50 g of deionized water and mixed for 30 minutes, to which 270 g of deionized water was added to obtain a water dispersion having a solid content of 20% and a particle size of 75 nm.

Production Example 10

(Aminated polybutadiene resin emulsion)

A reaction vessel was charged with 111 g of the aminated polybutadiene resin of Production Example 5, 2.9 g of acetic acid and 50 g of deionized water and mixed for 30 minutes, to which 260 g of deionized water was added to obtain a water dispersion having a solid content of 19.5% and a particle size of 70 nm.

Production Example 11

(Aminated polybutadiene resin solution)

1,000 g of epoxidized polybutadine (E1800-6.5, available from Nippon Petrochemical Co., Ltd.), 349 g of ethyleneglycol monobutyl ether and 46 g of dimethylamine were charged in a reaction vessel and reacted for about 5 hours at 150° C. After removing unreacted amine, it was cooled to 60° C. and a mixture of 138 g of a 50% lactic acid and 473 g of deionized water was added and mixed for 30 minuted at 80° C. Thereafter, 117 g of phenyl glycidyl ether was added and heated to 110° C., followed by reacting until the obtained mixture indicated an acid value of less than 0.1. After the completion of the reaction, 4037 g of deionized water was added to obtain an aqueous solution of 19.7%.

Production Example 12

(Vinyl copolymer E)

A same reaction vessel as Production Example 1 was charged with 175 g of dioxane and heated to 80° C. with stirring. A solution of 300 g of 2-butoxyethylalkoxyacyl methacrylamide, 200 g of n-butyl methacrylate, 12.5 g of azobisisobutylonitrile and 300 g of dioxane was prepared and added to the reaction vessel over 2 hours. After the completion of the addition, mixing continued for one hour and 25 g of a dioxane solution of 2.5 g of azobisisobutylonitrile was added, followed by reacting at 80° C. for 3 hours to obtain a resin solution having a nonvolatile content of 50% and a number average molecular weight of 8,700.

Production Example 13

(Vinyl copolymer F)

A same reaction vessel as Production Example 1 was charged with 175 g of dioxane and heated to 80° C. with stirring. Polymerization reaction was carried out as generally described in Production Example 12, with the exception that 300 g of 2-butoxy-1-methylethylalkoxyacyl methacrylamide was employed instead of 2-butoxyethylalkoxyacyl methacrylamide. The obtained resin had a nonvolatile content of 50% and a number average molecular weight of 7,600.

Production Example 14

(Vinyl copolymer G)

A same reaction vessel as Production Example 1 was charged with 175 g of dioxane and heated to 80° C. with stirring. Polymerization reaction was carried out as generally described in Production Example 12, with the exception that 300 g of 2-isobutyloxyethylalkoxyacyl methacrylamide was employed instead of 2-butoxyethylalkoxyacyl methacrylamide. The obtained resin had a nonvolatile content of 50% and a number average molecular weight of 8,500.

Production Example 15

(Vinyl copolymer H)

A same reaction vessel as Production Example 1 was charged with 175 g of dioxane and heated to 80° C. with stirring. Polymerization reaction was carried out as generally described in Production Example 12, with the exception that 300 g of 2-isobutyloxy-1-methylethylalkoxyacyl methacrylamide was employed instead of 2-butoxyethylalkoxyacyl methacrylamide. The obtained resin had a nonvolatile content of 50% and a number average molecular weight of 8,100.

Production Example 16

(Vinyl copolymer I)

A same reaction vessel as Production Example 1 was charged with 175 g of dioxane and heated to 80° C. with stirring. Polymerization reaction was carried out as generally described in Production Example 12, with the exception that 300 g of 2-isopropyloxy-1-methylethylalkoxyacyl methacrylamide was employed instead of 2-butoxyethylalkoxyacyl methacrylamide. The obtained resin had a nonvolatile content of 50% and a number average molecular weight of 8,400.

Production Example 17

(Vinyl copolymer J)

A same reaction vessel as Production Example 1 was charged with 175 g of dioxane and heated to 80° C. with stirring. Polymerization reaction was carried out as generally described in Production Example 12, with the exception that 300 g of 2-t-butyloxyethylalkoxyacyl/methacrylamide was employed instead of 2-butoxyethylalkoxyacyl methacrylamide. The obtained resin had a nonvolatile content of 50% and a number average molecular weight of 8,200.

Production Example 18

(Vinyl copolymer K)

A same reaction vessel as Production Example 1 was charged with 400 g of dioxane and heated to 80° C. with stirring. A solution of 130 g of 2-furanemethylalkoxyacyl methacrylamide, 120 g of n-butyl methacrylate and 475 g of dioxane was-separately prepared. And a solution of 6.25 g of azobisisobutylonitrile and 100 g of dioxane was also prepared. The two separate solutions were simultaneously added dropwise to the reaction vessel for 2 hours. After the completion of the addition, mixing continued for one hour and 25 g of a dioxane solution of 1.25 g of azobisisobutylonitrile was added, followed by reacting at 80° C. for 3 hours to obtain a resin solution having a nonvolatile content of 20% and a number average molecular weight of 6,300.

Production Example 19

(Vinyl copolymer L)

A same reaction vessel as Production Example 1 was charged with 350 g of dioxane and heated to 80° C. with stirring. A solution of 130 g of 2 -tetrahydrofuranemethylalkoxyacyl methacrylamide, 120 g of n-butyl methacrylate, 6.25 g of azobisisobutylonitrile and 375 g of dioxane was separately prepared. The separate solutions was added dropwise to the reaction vessel for 2 hours. After the completion of the addition, mixing continued for one hour and 25 g of a dioxane solution of 1.25 g of azobisisobutylonitrile was added, followed by reacting at 80° C. for 3 hours to obtain a resin solution having a nonvolatile content of 25% and a number average molecular weight of 6,700.

Production Example 20

(Vinyl copolymer M)

A same reaction vessel as Production Example 1 was charged with 350 g of dioxane and heated to 80° C. with stirring. Polymerization reaction was carried out as generally described in Production Example 19, with the exception that 130 g of 2-acetylmethylalkoxyacyl methacrylamide was employed instead of 2 -tetrahydrofuranemethylalkoxyacyl methacrylamide. The obtained resin had a nonvolatile content of 25% and a number average molecular weight of 7,100.

Production Example 21

(Vinyl copolymer N)

A same reaction vessel as Production Example 1 was charged with 350 g of dioxane and heated to 80° C. with stirring. Polymerization reaction was carried out as generally described in Production Example 19, with the exception that 130 g of methoxyacylmethylalkoxyacyl methacrylamide was employed instead of 2 -tetrahydrofuranemethylalkoxyacyl methacrylamide. The obtained resin had a nonvolatile content of 25% and a number average molecular weight of 6,800.

Example 1

(Cationic electrocoating composition containing the vinyl copolymer A)

A reaction vessel was charged with 135 g of the aminated epoxy resin A of Production Example 2 and 184 g of the vinyl copolymer A of Production Example 1 and mixed for 30 minutes at 40° C. To the content, 4 g of acetic acid and 182 g of deionized water were added and mixed for 30 minutes. Then, 500 g of deionized water was added to obtain an aqueous dispersion having a solid content of 20%. The obtained dispersion was charged in a stainless beaker and electrodeposition was conducted using the stainless as an anode on a cathode of a phosphated cold rolled steel panel at 70 volt for 3 minutes at 25° C. The coated panel was baked at 100° C. and 120° C. for 25 minutes to obtained a cured film having 20 micron.

Example 2

(Cationic electrocoating composition containing the vinyl copolymer A)

A reaction vessel was charged with 400 g of the aminated epoxy resin B of Production Example 3 and heated to 40° C. To the content, 4 g of acetic acid and 100 g of deionized water were added and mixed for 30 minutes. Then, 500 g of deionized water was added to obtain an aqueous dispersion having a solid content of 20%. The obtained dispersion was charged in a stainless beaker and electrodeposition was conducted using the stainless as an anode on a cathode of a phosphated cold rolled steel panel at 50 volt for 3 minutes at 25° C. The coated panel was baked at 120° C. for 25 minutes to obtained a cured film having 25 micron.

Example 3

(Cationic electrocoating composition containing the vinyl copolymer A / the aminated epoxy resin B)

A reaction vessel was charged with 135 g of the aminated epoxy resin B of Production Example 4 and 184 g of the vinyl copolymer A of Production Example 1 and mixed for 30 minutes at 40° C. To the content, 4 g of acetic acid and 177 g of deionized water was added and mixed for 30 minutes. Then, 500 g of deionized water was added to obtain an aqueous dispersion having a solid content of 20%. The obtained dispersion was charged in a stainless beaker and electrodeposition was conducted using the stainless as an anode on a cathode of a phosphated cold rolled steel panel at 100 volt for 3 minutes at 25° C. The coated panel was baked at 120° C. for 25 minutes to obtained a cured film having 20 micron.

Example 4

(Cationic electrocoating composition containing the vinyl copolymer A / the aminated polybutadiene)

A reaction vessel was charged with 145 g of the aminated polybutadiene resin of Production Example 5 and 184 g of the vinyl copolymer A of Production Example 1 and mixed for 30 minutes at 40° C. To the content, 4 g of acetic acid and 167 g of deionized water was added and mixed for 30 minutes. Then, 500 g of deionized water was added to obtain an aqueous dispersion having a solid content of 20%. The obtained dispersion was charged in a stainless beaker and electrodeposition was conducted using the stainless as an anode on a cathode of a phosphated cold rolled steel panel at 100 volt for 3 minutes at 25° C. The coated panel was baked at 120° C. for 25 minutes to obtained a cured film having 20 micron.

Example 5

(Cationic electrocoating composition containing the vinyl copolymer C the aminated epoxy resin A)

A reaction vessel was charged with 135 g of the aminated epoxy resin A of Production Example 2 and 184 g of the vinyl copolymer C of Production Example 6 and mixed for 30 minutes at 40° C. To the content, 4 g of acetic acid and 182 g of deionized water was added and mixed for 30 minutes. Then, 500 g of deionized water was added to obtain an aqueous dispersion having a solid content of 20%. Electrocoating and baking were conducted as generally described in Example 1 to obtained a cured film having 20 micron.

Example 6

(Cationic electrocoating composition containing the vinyl copolymer D the aminated epoxy resin A)

A reaction vessel was charged with 135 g of the aminated epoxy resin A of Production Example 2 and 165 g of the vinyl copolymer D of Production Example 7 and mixed for 30 minutes at 40° C. To the content, 4 g of acetic acid and 139 g of deionized water was added and mixed for 30 minutes. Then, 500 g of deionized water was added to obtain an aqueous dispersion having a solid content of 20%. Electrocoating and baking were conducted as generally described in Example 1 to obtained a cured film having 20 micron.

Example 7

(Cationic electrocoating composition containing the vinyl copolymer C the aminated epoxy resin A)

A reaction vessel was charged with 800 g of the aqueous dispersion of Example 1 and 54 g of the pigment paste of Production Example 8, to which 81 g of deionized water was added and mixed for 30 minutes to obtain an aqueous dispersion having a solid content of 20%. Electrocoating and baking were conducted as generally described in Example 1 to obtained a cured film having 20 micron.

Comparative Example 1

A reaction vessel was charged with 158 g of the aminated epoxy resin A of Production Example 2 and 96 g a blocked isocyanate curing agent (a reaction product of 1 equivalent of trimethylolpropane, 3 equivalents of tolylene diisocyanate and 3 equivalents of 2-ethylhexyl alcohol, having a nonvolatile content of 70%) and mixed for 30 minutes at 40° C. To the content, 4.9 g of acetic acid and 246 g of deionized water were added and mixed for 30 minutes. Then, 500 g of deionized water was added to obtain an aqueous dispersion having a solid content of 20% to which 2 g of dibutyltin oxide was added as catalyst. The obtained dispersion was charged in a stainless beaker and electrodeposition was conducted using the stainless as an anode on a cathode of a phosphated cold rolled steel panel at 150 volt for 3 minutes at 25° C. The coated panel was baked at 120° C. for 25 minutes.

Comparative Example 2

A reaction vessel was charged with 197 g of the aminated epoxy resin A of Production Example 2 and 66.5 g of 2-ethylhexyl alcohol-blocked terephthaloyl diisocyante and mixed for 30 minutes at 40° C. To the content, 5.5 g of acetic acid and 97.4 g of deionized water were added and mixed for 30 minutes. Then, 762 g of deionized water was added to obtain an aqueous dispersion having a solid content of 20%. The obtained dispersion was charged in a stainless beaker and electrodeposition was conducted using the stainless as an anode on a cathode of a phosphated cold rolled steel panel at 50 volt for 3 minutes at 25° C. The coated panel was baked at 120° C. for 25 minutes.

The curing properties (solvent resistance) of the cured films of Example 1 to 7 were evaluated and the results are shown in Table 1. All electrocoating compositions of Examples 1 to 7 and Comparative Examples 1 and 2 could provide uniform electrodeposited films after allowing to stand at 40° C. for one week.

TABLE 1

|  | Curing properties*¹ | |
|---|---|---|
|  | 120° C. | 100° C. |
| Examples No. | | |
| 1 | ood | Poor |
| 2 | Good | — |
| 3 | Good | — |
| 4 | Good | — |
| 5 | Good | — |
| 6 | Good | — |
| 7 | Good | — |
| Comparative Examples No. | | |
| 1 | Bad | — |
| 2 | Insufficient | — |

*¹The coating surface was robbed with a methyl isobutyl ketone saturated cloth 10 times both go and back.
Good shows no change.
Insufficient shows matting and adhering to the cloth.
Poor shows that the coating was peeled.

Example 8

A reaction vessel was charged with 35 g of the emulsion and 545 g of deionized water and heated to 75° C. with stirring. Then, 1.48 g of an acetic acid salt of 2,2'-azobis[2-(2-imidazoline-2-il)propane] was added and mixed for 5 minutes. A mixture of 70 g of the emulsion of Production Example 9, 70 g of deionized water, 101 g of 2-butoxyethylalkoxyacyl methacrylamide, 79 g of n-butyl methacrylate and 101 g of dioxane was charged in a dropping funnel and added dropwise to the reaction vessel over 45 minutes. After the completion of the addition, it was mixed for one hour at 75° C. and emulsion-polymerized to obtain polymer particles emulsion having a nonvolatile content of 20% and a particle size of 90 nm.

The obtained emulsion was charged in a stainless beaker, to which 1,000 g of the emulsion of Production Example 9 was added to form an electrocoating compositional. Electrodeposition was conducted using the stainless as an anode on a cathode of a phosphated cold rolled steel panel at 100 volt for 3 minutes at 25° C. The coated panel was baked at 120° C. for 25 minutes to obtain a cured film of 20 micron.

Example 9

A polymer particles emulsion having a nonvolatile content of 20% and a particle size of 100 nm was obtained as generally described in Example 8, with the exception that the emulsion of Production Example 10 was employed instead of the emulsion of Production Example 9.

The obtained emulsion was charged in a stainless beaker, to which 1,000 g of the emulsion of Production Example 9 was added to form an electrocoating compositional. Electrodeposition was conducted using the stainless as an anode on a cathode of a phosphated cold rolled steel panel at 100 volt for 3 minutes at 25° C. The coated panel was baked at 120° C. for 25 minutes to obtain a cured film of 20 micron.

Example 10

A polymer particles emulsion having a nonvolatile content of 20% and a particle size of 120 nm was obtained as generally described in Example 8, with the exception that the emulsion of Production Example 11 was employed instead of the emulsion of Production Example 9.

The obtained emulsion was charged in a stainless beaker, to which 1,000 g of the emulsion of Production Example 9 was added to form an electrocoating compositional. Electrodeposition was conducted using the stainless as an anode on a cathode of a phosphated cold rolled steel panel at 100 volt for 3 minutes at 25° C. The coated panel was baked at 120° C. for 25 minutes to obtain a cured film of 20 micron.

The coating compositions of Examples 8 to 10 were stored for one month at 30° C. and their stability was evaluated. The results are shown in Table 2.

A steel panel which had an edge angle of 90° was electrocoated using the compositions of Examples 8 to 10 with such conditions to form a coated film of 20 micron. The obtained panels were cured at 120° C. and 140° C. and the curing properties of the cured films were evaluated. The results are also shown in Table 2. In addition, the panels cured at 120° C. were subjected to a salt spray test according to JIS Z 2371 and rusts after 168 hours were evaluated. The results are shown in Table 2.

TABLE 2

| Examples No. | Storage stability | Curing properties*¹ | | Rust resistance at edge portion |
|---|---|---|---|---|
|  |  | 120° C. | 100° C. |  |
| 8 | Electrodepositable | Good | Good | No rusts |
| 9 | Electrodepositable | Good | Good | No rusts |
| 10 | Electrodepositable | Good | Good | No rusts |

*¹The same as Table 1

Example 11

A paint was prepared by mixing 2,000 g of Power Top U-30 Black (nonvolatile content 20%; available from Nippon Paint Co., Ltd.) and 300 g of the polymerized emulsion (nonvolatile content 20%); 90 nm particle size of Production Example 8. It was coated on a steel panel having an edge angle of 90° to form a 20 micron thickness film, an then cured. The cured panel was subjected to a salt spray test according to JIS Z 2371 to find that rusts occurence after 168 hours was much less than a paint which excluded the emulsion of Production Example 8.

Example 12

A reaction vessel was charged with 135 g of the aminated epoxy resin A of Production Example 2 and 182 g of the vinyl copolymer E of Production Example 12 and mixed for 30 minutes at 40° C. To the content, 4 g of acetic acid and 182 g of deionized water were added and mixed for 30 minutes. Then, 500 g of deionized water was added to obtain an aqueous dispersion having a solid content of 20%. The obtained dispersion was charged in a stainless beaker and electrodeposition was conducted using the stainless as an anode on a cathode of a phosphated cold rolled steel panel at 80 volt for 3 minutes at 25° C. The coated panel was baked at 100° C. and 120° C. for 25 minutes to obtained a cured film having 20 micron.

Example 13

An aqueous dispersion was obtained as generally described in Example 12, with the exception that the vinyl copolymer F of Production Example 13 was employed instead of the vinyl copolymer E of Production Example 12. The obtained dispersion was charged in a stainless beaker and electrodeposition was conducted using the stainless as an anode on a cathode of a phosphated cold rolled steel panel at 90 volt for 3 minutes at 25° C. The coated panel was baked at 100° C. and 120° C. for 25 minutes to obtained a cured film having 20 micron.

Example 14

An aqueous dispersion was obtained as generally described in Example 12, with the exception that the vinyl copolymer G of Production Example 14 was employed instead of the vinyl copolymer E of Production Example 12. The obtained dispersion was charged in a stainless beaker and electrodeposition was conducted using the stainless as an anode on a cathode of a phosphated cold rolled steel panel at 90 volt for 3 minutes at 25° C. The coated panel was baked at 100° C. and 120° C. for 25 minutes to obtained a cured film having 20 micron.

Example 15

An aqueous dispersion was obtained as generally described in Example 12, with the exception that the vinyl copolymer H of Production Example 15 was employed instead of the vinyl copolymer E of Production Example 12. The obtained dispersion was charged in a stainless beaker and electrodeposition was conducted using the stainless as an anode on a cathode of a phosphated cold rolled steel panel at 90 volt for 3 minutes at 25° C. The coated panel was baked at 100° C. and 120° C. for 25 minutes to obtained a cured film having 20 micron.

Example 16

An aqueous dispersion was obtained as generally described in Example 12, with the exception that the vinyl copolymer I of Production Example 16 was employed instead of the vinyl copolymer E of Production Example 12. The obtained dispersion was charged in a stainless beaker and electrodeposition was conducted using the stainless as an anode on a cathode of a phosphated cold rolled steel panel at 90 volt for 3 minutes at 25° C. The coated panel was baked at 100° C. and 120° C. for 25 minutes to obtained a cured film having 20 micron.

Example 17

An aqueous dispersion was obtained as generally described in Example 12, with the exception that the vinyl copolymer J of Production Example 17 was employed instead of the vinyl copolymer E of Production Example 12. The obtained dispersion was charged in a stainless beaker and electrodeposition was conducted using the stainless as an anode on a cathode of a phosphated cold rolled steel panel at 80 volt for 3 minutes at 25° C. The coated panel was baked at 100 ° C. and 120° C. for 25 minutes to obtained a cured film having 20 micron.

Example 18

A reaction vessel was charged with 135 g of the aminated epoxy resin A of Production Example 2 and 455 g of the vinyl copolymer K of Production Example 18 and mixed for 30 minutes at 40° C. To the content, 4 g of acetic acid and 50 g of deionized water were added and mixed for 30 minutes. Then, 360 g of deionized water was added to obtain an aqueous dispersion having a solid content of 20%. The obtained dispersion was charged in a stainless beaker and electrodeposition was conducted using the stainless as an anode on a cathode of a phosphated cold rolled steel panel at 40 volt for 3 minutes at 25° C. The coated panel was baked at 100° C. and 120° C. for 25 minutes to obtained a cured film having 20 micron.

Example 19

A reaction vessel was charged with 135 g of the aminated epoxy resin A of Production Example 2 and 364 g of the vinyl copolymer L of Production Example 19 and mixed for 30 minutes at 40° C. To the content, 4 g of acetic acid and 50 g of deionized water were added and mixed for 30 minutes. Then, 451 g of deionized water was added to obtain an aqueous dispersion having a solid content of 20%. The obtained dispersion was charged in a stainless beaker and electrodeposition was conducted using the stainless as an anode on a cathode of a phosphated cold rolled steel panel at 40 volt for 3 minutes at 25° C. The coated panel was baked at 100° C. and 120° C. for 25 minutes to obtained a cured film having 20 micron.

Example 20

An aqueous dispersion was obtained as generally described in Example 19, with the exception that the vinyl copolymer L of Production Example 19 was employed instead of the vinyl copolymer M of Production Example 20. The obtained dispersion was charged in a stainless beaker and electrodeposition was conducted using the stainless as an anode on a cathode of a phosphated cold rolled steel panel at 80 volt for 3 minutes at 25° C. The coated panel was baked at 100° C. and 120° C. for 25 minutes to obtained a cured film having 20 micron.

Example 21

An aqueous dispersion was obtained as generally described in Example 19, with the exception that the vinyl copolymer L of Production Example 19 was employed instead of the vinyl copolymer N of Production Example 21. The obtained dispersion was charged in a stainless beaker and electrodeposition was conducted using the stainless as an anode on a cathode of a phosphated cold rolled steel panel at 80 volt for 3 minutes at 25° C. The coated panel was baked at 100° C. and 120° C. for 25 minutes to obtained a cured film having 20 micron.

The curing properties (solvent resistance) of the cured films of Example 12 to 21 were evaluated and the results are shown in Table 3. All electrocoating compositions of Examples 11 to 20 could provide uniform electrodeposited films after allowing to stand at 40° C. for one week.

TABLE 3

| Examples No. | Curing properties*[1] | |
|---|---|---|
|  | 100° C. | 120° C. |
| 12 | Good | Good |
| 13 | Good | Good |
| 14 | Good | Good |
| 15 | Good | Good |
| 16 | Good | Good |
| 17 | Good | Good |
| 18 | Good | Good |
| 19 | Good | Good |
| 20 | Good | Good |
| 21 | Good | Good |

*[1]The same as Table 1

Production Example 22

(Vinyl polymer O)

A same reaction vessel as Production Example 1 was charged with 350 g of dioxane and heated to 80° C. with stirring. Polymerization reaction was carried out as generally described in Production Example 19, with the exception that 100 g of N-(2-butylideneaminoxycarbonyl) methacrylamide was employed instead of 2-tetrahydrofuranemethylalkoxyacyl methacrylamide. The obtained resin had a nonvolatile content of 22.2% and a number average molecular weight of 6,200.

Production Example 23

(Vinyl polymer P)

A same reaction vessel as Production Example 1 was charged with 350 g of dioxane and heated to 80° C. with stirring. Polymerization reaction was carried out as generally described in Production Example 19, with the exception that 100 g of N-(2-(4-methyl)pentylideneaminoxycarbonyl)methacrylamide was employed instead of 2-tetrahydrofuranemethylalkoxyacyl methacrylamide. The obtained resin had a nonvolatile content of 22.0% and a number average molecular weight of 6,700.

Production Example 24

(Secondary amino group-containing epoxy resin C)

A reaction vessel was charged with 1,548 g of the aminated epoxy resin A of Production Example 2 and 27 g of water, and heated to 100° C. After keeping it for 90 minutes, 60 g of Denacol EX-192 (a monoepoxy resin available from Nagase Kasei Co., Ltd.) was added and mixed at 100° C. for 3 hours, and then cooled to obtain a secondary amino group-containing epoxy resin having a nonvolatile content of 82.9%.

Production Example 25

(Vinyl polymer Q)

A reaction vessel equipped with a dropping funnel, a condenser, a thermometer and a stirrer was charged with 200 g of dioxane and heated to 80° C. with stirring. A solution of 55 g of dimethylaminopropyl methacrylamide, 75 g of 2-hydroxyethyl methacrylate, 370 g of n-butyl methacrylate, 25 g of azobisisobutylonitrile and 250 g of dioxane was prepared and added dropwise to the reaction vessel over 2 hours. After the completion of the addition, it was mixed for one hour and 50 g of a dioxane solution of 5 g of azobisisobutylonitrile was added, followed by polymerizing at 80° C. for 3 hours to obtain a resin solution having a nonvolatile content of 51.8% and a number average molecular weight of 5,800.

Production Example 26

(Acryl emulsion A)

A reaction vessel equipped with a reflux condenser, a thermometer and a stirrer was charged with 580 g of the vinyl polymer E of Production Example 12 and 240 g of the vinyl polymer Q of Production Example 25, and mixed for 30 minutes at 40° C. Then, 5.2 g of acetic acid and 240 g of deionized water were added and mixed for 30 minutes. To the content, 1,000 g of deionized water was added to obtain an acryl emulsion A having a nonvolatile content of 20 2%.

Production Example 27

(Acryl emulsion B)

A reaction vessel equipped with a reflux condenser, a thermometer and a stirrer was charged with 580 g of the vinyl polymer E of Production Example 12 and 153 g of the aminated epoxy resin B of Production Example 4, and mixed for 30 minutes at 40° C. Then, 6.0 g of acetic acid and 240 g of deionized water were added and mixed for 30 minutes. To the content, 1,090 g of deionized water was added to obtain an acryl emulsion B having a nonvolatile content of 19.7%.

Production Example 28

(Aminated epoxy resin D)

A chain extension was carried out as generally described in Production Example 2 and, at an epoxy equivalent of 1,100, 220 g of methyl isobutyl ketone was added and cooled to 60° C. At this temperature, 73 g of diethylamine was added and mixed for one hour at 70° C. It was then slowly heated to 100° C. and mixed for 30 minutes hour, followed by cooling to obtain an aminated epoxy resin D having a nonvolatile content of 80.1%.

Production Example 29

(Aminated epoxy resin emulsion B)

A reaction vessel equipped with a reflux condenser, a thermometer and a stirrer was charged with 770 g of the aminated epoxy resin A of Production Example 2, 15 g of acetic acid and 200 g of deionized water, and homogeneously mixed. Then, 2,100 g of deionized water was slowly added to obtain an emulsion B having a nonvolatile content of 20.1%.

Production Example 30

(Vinyl polymer R)

A reaction vessel equipped with a dropping funnel, a condenser, a thermometer and a stirrer was charged with 175 g of dioxane and heated to 80° C. with stirring. A solution of 300 g of 2-butoxyethylalkoxyacyl methacrylamide, 50 g of 2-hydroxyethyl methacrylate, 150 g of n-butyl methacrylate, 12.5 g of azobisisobutylonitrile, 150 g of dioxane and 150 g of ethyleneglycol monobutyl ether was prepared and added dropwise to the reaction vessel over 2 hours. After the completion of the addition, it was mixed for one hour and 25 g of a dioxane solution of 2.5 g of azobisisobutylonitrile was added, followed by polymerizing at 80° C. for 3 hours to obtain a resin solution having a nonvolatile content of 49.6% and a number average molecular weight of 9,300.

Example 22

A reaction vessel was charged with 356 g of the vinyl polymer O of Production Example 22 and 135 g of the aminated epoxy resin D of Production Example 28 and homogeneously mixed. To the content, 3.5 g of acetic acid and 50 g of deionized water were added and mixed for 10 minutes. Then, 420 g of deionized water was slowly added to obtain an emulsion having a solid content of 18.6%. The obtained emulsion was charged in a stainless beaker and electrodeposition was conducted using the stainless as an anode on a cathode of a phosphated cold rolled steel panel at 70 volt for 3 minutes at 25° C. The coated panel was baked at 100° C. and 120° C. for 25 minutes to obtained a cured film having 20 micron.

Example 23

An emulsion having a nonvolatile content of 18.4% was obtained as generally described in Example 22, with the exception that the vinyl polymer of Production Example 23 was employed instead of the vinyl polymer of Production Example 22.

Electrodeposition was conducted using the stainless as an anode on a cathode of a phosphated cold rolled steel panel as generally described in Example 22 to obtain a cured film of 20 micron.

Example 24

A reaction vessel was charged with 131 g of the aminated epoxy resin C of Production Example 24 and 182 g of the vinyl copolymer E of Production Example 12 and homogeneously mixed. To the content, 4 g of acetic acid and 50 g of deionized water were added and mixed for 10 minutes. Then, 630 g of deionized water was slowly added to obtain an emulsion having a solid content of 20.2%. The obtained dispersion was charged in a stainless beaker and electrodeposition was conducted using the stainless as an anode on a cathode of a phosphated cold rolled steel panel at 70 volt for 3 minutes at 25° C. The coated panel was baked at 100° C. and 120° C. for 25 minutes to obtained a cured film having 20 micron.

Example 25

A stainless beaker was charged with 650 g of the acryl emulsion A of Production Example 26 and 350 g of the aminated epoxy emulsion B of Production Example 29, and homogeneously mixed. A phosphated cold rolled steel panel was employed as cathode and the stailess beaker was employed as anode, and it was then electrocoated at 25° C. The coated panel was baked at 120° C. for 25 minutes to obtain a cured film of 20 micron.

Example 26

A cured film having 20 micron thickness was obtained as generally described in Example 25, with the exception that the acryl emulsion B of Production Example 27 was employed instead of the acryl emulsion A of Production Example 26.

Example 27

A reaction vessel was charged with 182 g of the vinyl polymer R of Production Example 30 and 135 g of the aminated epoxy resin A of Production Example 2 and homogeneously mixed. To the content, 4.0 g of acetic acid and 182 g of deionized water were added and mixed for 30 minutes. Then, 500 g of deionized water was slowly added to obtain an emulsion having a solid content of 20.0%. The obtained emulsion was charged in a stainless beaker and electrodeposition was conducted using the stainless as an anode on a cathode of a phosphated cold rolled steel panel at 70 volt for 3 minutes at 25° C. The coated panel was baked at 100° C. and 120° C. for 25 minutes to obtained a cured film having 20 micron.

The curing properties (solvent resistance) of the cured films of Example 22 to 27 were evaluated and the results are shown in Table 4. All electrocoating compositions of Examples 22 to 27 could provide uniform electrodeposited films after allowing to stand at 30° C. for two weeks.

TABLE 3

| Examples No. | Curing properties*[1] | |
|---|---|---|
| | 100° C. | 120° C. |
| 22 | Good | Good |
| 23 | Good | Good |
| 24 | | Good |
| 25 | | Good |
| 26 | | Good |
| 27 | | Good |

*[1]The same as Table 1

What is claimed is:

1. A cationic electrocoating composition comprising a resinous component and an aqueous medium, which is free of blocked isocyanates and curable at a temperature of 100° to 140° C., wherein said resin component comprises:

($P_2$) a vinyl polymer resin component having 5 to 1,000 substituted acylamide groups represented by

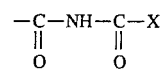

wherein X is $-OR_1$, $-NR_2R_3$, $-SR_4$ or $-CR_5R_6R_7$, provided that $R_1$ and $R_4$ respectively represent an alkyl group, an alkenyl group, an alkynyl group, an aralkyl group, an aryl group, an imino group, an acyl group or an imide group, which may be substituted or cyclized, $R_2$ and $R_3$ respectively represent a hydrogen atom, an alkyl group, an alkenyl group, an alkynyl group, an aralkyl group, an aryl group or an acyl group, which may be substituted or cyclized and at least one of $R_5$, $R_6$ and $R_7$ is an acyl group, and the other members of $R_5$, $R_6$ and $R_7$ respectively represent a hydrogen atom, an alkyl group, an alkenyl group an alkynyl group, an aralkyl group, an aryl group or an acyl group, which may be substituted or cyclized, and ($r_2$) a resinous component having an active hydrogen containing group and a cationic group as a whole, wherein said substituted acylamide group is present in an equivalent of at least $1 \times 10^{-5}$, said active hydrogen-containing group is selected from the group consisting of an amino group, a hydroxyl group and a mixture thereof and present in an equivalent of at least $1 \times 10^{-5}$, and said cationic group is present in an equivalent of $1 \times 10^{-4}$ to $40 \times 10^{-4}$, each of said aforesaid equivalents being based upon 1 gram of all resin components in the composition, said vinyl polymer ($p_2$) being either prepared by subjecting monomers to emulsion polymerization and then mixed with the other resinous component ($r_2$) or prepared by subjecting monomers to solution polymerization and then mixed with the other resinous component ($r_2$) in the presence of water and acid to form polymer particles, whereby said substituted acylamide groups are protected in the particles.

2. The cationic electrocoating composition according to claim 1, wherein said resinous component is prepared by the following steps (i) and (ii):

(i) a vinyl polymer is prepared by solution polymerization of a substituted acylamide group-containing vinyl monomer ($m_3$) represented by $$CH_2=\underset{R}{\underset{|}{C}}-\underset{O}{\underset{\|}{C}}-NH-\underset{O}{\underset{\|}{C}}-X$$

wherein R represents a hydrogen atom or an alkyl group having 1 to 4 carbon atoms, and X is $-OR_1$, $-NR_2R_3$, $-SR_4$ or $-CR_5R_6R_7$, provided that $R_1$ and $R_4$ respectively represent an alkyl group, an alkenyl group, an alkynyl group, an aralkyl group, an aryl group, an imino group, an acyl group or an imide group, which may be substituted or cyclized, $R_2$ and $R_3$ respectively represent a hydrogen atom, an alkyl group, an alkenyl group, an alkynyl group, an aralkyl group, an aryl group or an acyl group, which may be substituted or cyclized and at least one of $R_5$, $R_6$ and $R_7$ is an acyl group, and the other respectively represents a hydrogen atom, an alkyl group, an alkenyl group, an alkynyl group, an aralkyl group, an aryl group or an acyl group, which may be substituted or cyclized, and optionally another vinyl monomer ($m_4$), and (ii) the obtained vinyl polymer is mixed with a resin having a hydroxyl group, a secondary or tertiary amino group, a quaternary ammonium group, a tertiary thionium group or a mixture thereof in the presence of water or a combination of water and acid.

3. The cationic electrocoating composition according to claim 1 wherein said $R_1$ to $R_7$ has an oxygen atom at a gamma position or a nitrogen atom at an alpha position in respect to O, N, S or C.

4. The cationic electrocoating composition according to claim 1 wherein said cationic group is provided from an amino group.

5. The cationic electrocoating composition according to claim 1 wherein said vinyl polymer ($p_2$) is prepared by reacting a substituted acylamide group-containing vinyl monomer ($m_3$) represented by $$CH_2=\underset{R}{\underset{|}{C}}-\underset{O}{\underset{\|}{C}}-NH-\underset{O}{\underset{\|}{C}}-X$$

wherein R represents a hydrogen atom or an alkyl group having 1 to 4 carbon atoms, and X is the same as mentioned above, and optionally another vinyl monomer ($m_4$).

6. The cationic electrocoating composition according to claim 5 wherein said vinyl polymer ($p_2$) is vinyl polymer particles prepared by emulsion polymerization.

7. The cationic electrocoating composition according to claim 6 wherein said emulsion polymerization is carried out in the presence of an aminated epoxy resin as an emulsifier.

8. The cationic electrocoating composition according to claim 5 wherein said vinyl polymer ($p_2$) is prepared by solution polymerization and mixed with a resin having a hydroxyl group, a secondary or tertiary amino group, a quaternary ammonium group, a tertiary thionium group or a mixture thereof in the presence of water or a combination of water and acid to change vinyl polymer particles.

9. The cationic electrocoating composition according to claim 1 wherein said other resinous component ($r_2$) is an epoxy resin having both an active hydrogen containing group and a cationic group.

10. The cationic electrocoating composition according to claim 1 wherein said resinous component comprises;

($p_3$) a vinyl polymer having a substituted acylamide group and a cationic group, and ($r_3$) the other resinous component having an active hydrogen-containing group.

11. The cationic electrocoating composition according to claim 1 wherein said vinyl polymer ($p_3$) is prepared by polymerizing the monomer ($m_2$), the monomer ($m_3$) and optionally the monomer ($m_4$).

12. The cationic electrocoating composition according to claim 1 wherein said resinous component comprises;

($p_4$) a vinyl polymer having a substituted acylamide group and an active hydrogen-containing group, and ($r_4$) the other resinous component having a cationic group.

13. The cationic electrocoating composition according to claim 12 wherein said vinyl polymer ($p_4$) is prepared by polymerizing the monomer ($m_1$), the monomer ($m_3$) and optionally the monomer ($m_4$).

14. Reactive vinyl polymer particles prepared by the following steps:

(i) a vinyl polymer is prepared by solution polymerization of a substituted acylamide group-containing vinyl monomer ($m_3$) represented by $$CH_2=\underset{R}{\underset{|}{C}}-\underset{O}{\underset{\|}{C}}-NH-\underset{O}{\underset{\|}{C}}-X$$

wherein R represents a hydrogen atom or an alkyl group having 1 to 4 carbon atoms, and X is $-OR_1$, $-NR_2R_3$, $-SR_4$ or $-CR_5R_6R_7$, provided that $R_1$ and $R_4$ respectively represent an alkyl group, an alkenyl group, an alkynyl group, an aralkyl group, an aryl group, an imino group, an acyl group or an imide group which may be substituted or cyclized, $R_2$ and $R_3$ respectively represent a hydrogen atom, an alkyl group, an alkenyl group, an alkynyl group, an aralkyl group, an aryl group or an acyl group, which may be substituted or cyclized and at least one of $R_5$, $R_6$ and $R_7$ is an acyl group, and the other respectively represents a hydrogen atom, an alkyl group, an alkenyl group, an alkynyl group, an aralkyl group, an aryl group or an acyl group, which may be substituted or cyclized, and optionally another vinyl monomer ($m_4$), and (ii) the obtained vinyl polymer is mixed with a resin having a hydroxyl group, a secondary or tertiary amino group, a quaternary ammonium group, a tertiary thionium group or a mixture thereof in the presence of water or a combination of water and acid.

* * * * *